April 11, 1944.  C. E. READ ET AL  2,346,275
PISTON STRUCTURE FOR SHOCK ABSORBERS
Filed Dec. 7, 1942
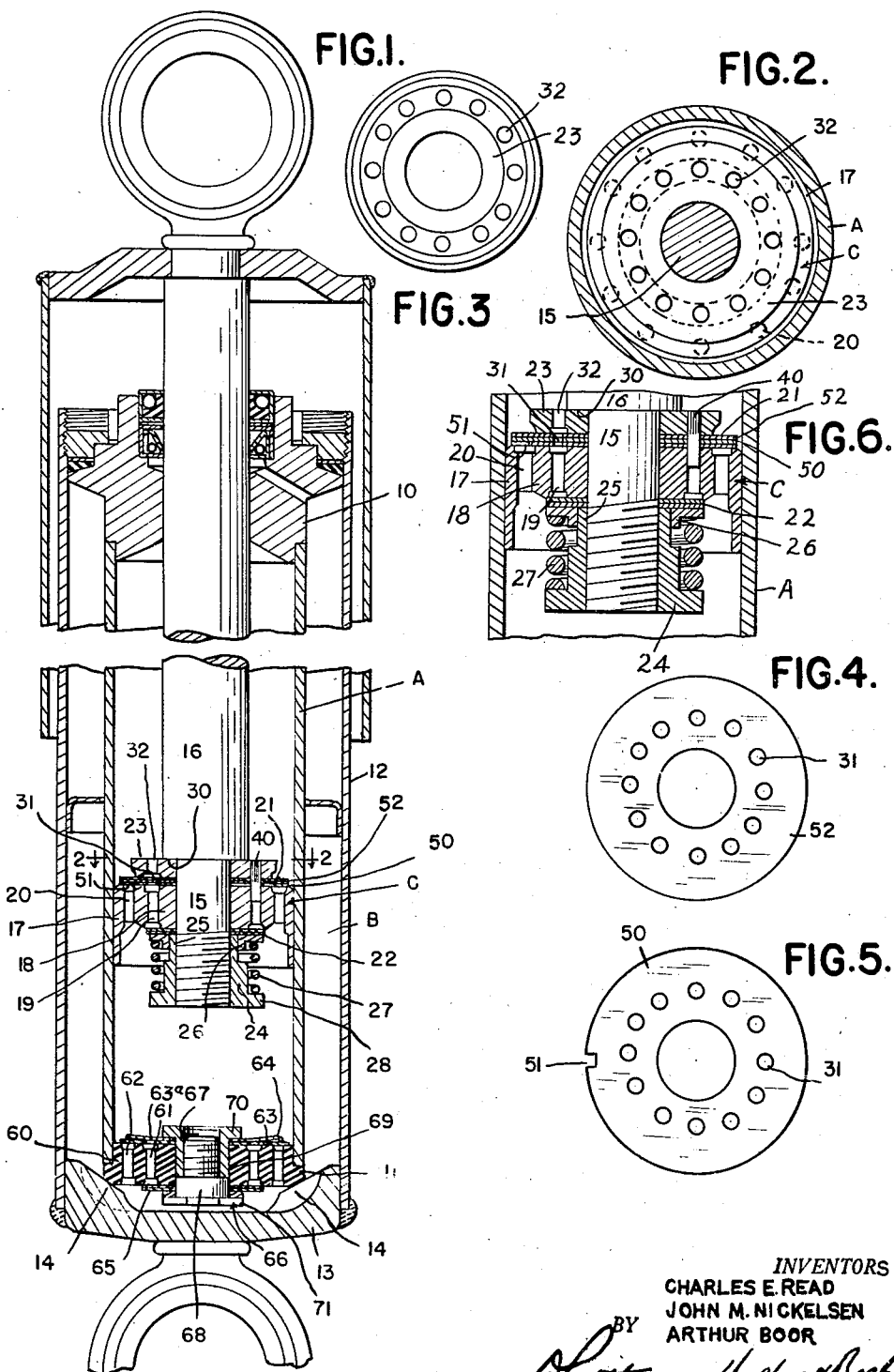
INVENTORS
CHARLES E. READ
JOHN M. NICKELSEN
ARTHUR BOOR
BY
ATTORNEYS Patented Apr. 11, 1944

2,346,275

UNITED STATES PATENT OFFICE 2,346,275

PISTON STRUCTURE FOR SHOCK ABSORBERS

Charles E. Read, Monroe, and John M. Nickelsen, Ann Arbor, Mich., and Arthur Boor, Toledo, Ohio, assignors to Monroe Auto Equipment Company, Monroe, Mich., a corporation of Michigan Application December 7, 1942, Serial No. 468,158

9 Claims. (Cl. 188—88)

This invention relates generally to hydraulic shock absorbers and refers more particularly to improved piston assemblies for direct acting shock absorbers.

One of the essential objects of the present invention is to provide a piston assembly having means for positively or definitely controlling the upward flow of hydraulic medium through the piston from the lower portion of the pressure cylinder to the upper portion thereof so that the full volume of the pressure cylinder instead of the usual piston rod displacement only will be utilized for obtaining the desired shock absorber action.

Another object is to provide a piston assembly wherein the means aforesaid is so constructed that the resistance offered thereby to the upward flow of hydraulic medium through the piston will be just a little less than or substantially the same as the resistance offered by the base compression valve to the piston rod displacement.

Another object is to provide a piston assembly wherein a standard type of piston and standard parts on the rebound side thereof may be used.

Another object is to provide a piston assembly that is constructed and operable in such a way that the length of the shock absorber need not be appreciably increased.

Other objects, advantages and novel details of construction of this invention will be made more apparent as this description proceeds, especially when considered in connection with the accompanying drawing, wherein:

Figure 1 is a vertical longitudinal sectional view through a shock absorber having a piston assembly embodying our invention;

Figure 2 is a cross sectional view taken substantially on the line 2—2 of Figure 1;

Figure 3 is a detail plan view of the backing plate for the upper laminated disc valve carried by the piston;

Figure 4 is a detail plan view of one of the discs of the upper laminated valve carried by the piston;

Figure 5 is a detail view of the metering spacer disc of the upper laminated valve carried by the piston;

Figure 6 is an enlarged cross sectional view of the piston and its valve structure.

Referring now to the drawing, A is the pressure cylinder, B is the reserve chamber, and C is the piston assembly embodying our invention of a hydraulic shock absorber of the direct acting type.

As shown, the pressure cylinder A is tubular in form and is provided at its upper end with a closure 10 and at its lower end with a base compression valve assembly 11.

The reserve chamber B is annular in form and is provided between the cylinder A and an outer substantially concentric casing member 12. Preferably the casing member 12 is mounted at one end upon the closure 10 and is provided at its other end beneath and in spaced relation to the compression valve assembly 11 with a closure 13 having upstanding lugs 14 engaging and forming seats for the lower end of the cylinder A.

The piston assembly C is within the pressure cylinder A and is carried by the reduced end portion 15 of a rod 16 that slidably engages and extends outwardly through the closure 10 for the pressure cylinder. Preferably this flanged assembly comprises a piston 17 slidably engaging the walls of the pressure cylinder A and provided through the body 18 thereof with inner and outer sets 19 and 20, respectively, of passages. Laminated disc valves 21 and 22, respectively, upon the top and bottom of the body 18 of the piston control the flow of hydraulic medium through said passages 19 and 20. A backing plate 23 is provided for the upper valve 21, while a fastener element 24 below the lower valve 22 threadedly engages the reduced end portion 15 of the rod and has a tubular part 25 engaging the underside of the lower laminated valve 22. A flanged ring 26 is slidably mounted on the tubular part 25 of the fastener element 24 and also engages the underside of the lower laminated valve 22, while a coil spring 27 sleeved on the fastener element 24 between a lateral flange 28 at the lower end thereof and the slidable ring 26 at the upper end thereof engages the valve 22.

The upper laminated disc valve 21 is substantially equal in area to the body 18 of the piston and normally closes the upper ends of the outer passages 20 in the piston, while the lower laminated disc valve 22 has a smaller area and normally closes the lower ends of the inner passages 19 in the piston.

The backing plate 23 for the upper laminated valve 21 is sleeved on the reduced portion 15 of the rod against a shoulder 30 thereof at the upper end of said reduced portion 15 and has an area less than that of the upper laminated valve 21 to permit the peripheral portion of said valve 21 to flex upwardly during the downward compression stroke of the piston.

The flanged ring 26 on the tubular part 25 of the fastener element 24 cooperates with said tubular part 25 to form a backing for the lower laminated valve 22, however the ring 26 is slidable on said tubular part 25 against the tension of the spring 27 to permit the peripheral portion of said valve 22 to flex downwardly during the upward rebound stroke of the piston. In this connection it will be noted that the laminations or discs of the upper valve 21 have registering openings 31 therein, that the backing plate 23 also has openings 32 therein, and that the registering openings 31 in the laminations of the valve 21 and the openings 32 in the backing plate 23 are in exact alignment or registration with the inner set 19 of passages in the piston. In fact, a hole alignment pin 40 may be employed when the parts are being assembled to insure proper alignment of the respective openings 31 and 32 with the passages 19. Moreover, the laminations or discs of the valve 21 may include at the bottom thereof a metering spacer disc 50 which has at its periphery one or more notches or slots 51 which constitute bleed openings for the hydraulic medium and permit it to leak from the passages 20 in the piston to the upper portion of the pressure cylinder A during the downward movement of the piston. Thus, these slots meter the hydraulic medium and provide a little or limited resistance to the upward flow of the hydraulic medium during relatively smooth or boulevard riding conditions. Preferably this metering disc 50 has the same diameter as the upper discs 52 but may vary in thickness, as desired. For example, the upper discs 52 should be flat within .002 of an inch in thickness, while the metering spacer disc 50 may be .008 of an inch in thickness. Preferably the metering spacer disc 50 and upper discs 52 are made of spring steel.

Thus, from the foregoing, it will be apparent that a hydraulic medium such as oil or other suitable fluid in the pressure cylinder A is permitted to flow in opposite directions through the piston 17 as the latter reciprocates in said cylinder, and that the rate of flow in opposite directions through the piston is controlled by the respective laminated valves 21 and 22. For example, the upper valve 21 controls the flow of the medium upwardly through the piston when the latter is moved downwardly during its compression stroke in the cylinder A, while the lower valve 22 controls the flow of the medium downwardly through the piston when the latter is moved upwardly during its rebound stroke in the cylinder A.

The base compression valve assembly 11 at the lower end of the pressure cylinder A has rigid with the cylinder A a body 60 provided with inner and outer sets 61 and 62, respectively, of passages. A disc valve 63 is on top of the body 60 and is normally held by a light substantially star shaped spring 64 in closed position over the upper ends of the outer set 62 of passages. Such valve 63 has openings 63a registering with the inner set 61 of passages. A laminated disc valve 65 is on the underside of said body 60 and normally closes the lower ends of the inner set 61 of passages, while a common fastener element 66 for said valves has cooperating sections 67 and 68, respectively, threadedly engaging each other within a suitable opening 69 in the body 60 and has lateral flanges 70 and 71, respectively, overlying and underlying the valves 63 and 65. Preferably the arrangement is such that the lower valve 65 will open simultaneously with or just after the upper valve 21 on the piston 17 so as to offer substantially the same or just a little more resistance to the downward flow of hydraulic medium through the inner passages 61 in the body 60 of the base compression valve assembly when the piston moves downwardly on its compression stroke, while the upper valve 63 will permit the hydraulic medium to flow upwardly relatively freely through the body 60 from the reserve chamber B to the pressure cylinder A and therefore will offer very little resistance when the piston 17 is moved upwardly during its rebound stroke.

In use, when the piston 17 initially moves downward, for example, during relatively smooth or boulevard riding conditions, the hydraulic medium in the passages 20 will be metered through the slots 51 in the disc 50 to the space within the cylinder A above the piston. During further downward movement of the piston the pressure of the hydraulic medium within the lower portion of the cylinder A below the piston will increase sufficiently to flex upwardly the peripheral portion of the upper valve 21 carried by the piston and thereby permit the hydraulic medium to flow upwardly through the piston from the lower portion of the cylinder A to the upper portion thereof. At approximately the same time or just thereafter the lower laminated disc valve 65 of the base compression valve assembly 11 will likewise be opened so that hydraulic medium may flow from the lower portion of the pressure cylinder A to the reserve chamber B. Upon the upward rebound stroke of the piston 17 in the pressure cylinder A hydraulic medium in the reserve chamber B will flow upwardly through the passages 62 past the valve 63 into the lower end of the pressure cylinder A. Likewise, hydraulic medium in the upper portion of the pressure cylinder A will flow downwardly through the aligned openings 32, 31 and 19 past the lower valve 22 carried by the piston 17 to the lower portion of the pressure cylinder A.

Thus, from the foregoing, it will be appreciated that the slots 51 in the metering disc 50 will provide a limited or slight resistance to the upward flow of the hydraulic medium through the piston during the downward compression movement thereof while relatively smooth or boulevard riding conditions exist; that the resistance offered by the upper laminated disc valve 21 carried by the piston to the upward flow of hydraulic medium through the piston during the compression stroke thereof will be just a little less than or substantially the same as the resistance offered by the base compression valve element 65 to the piston rod displacement and therefore will open just in advance of or simultaneously with the valve 65 of the base compression valve assembly; that the valve 63 will open in advance of the valve 22 carried by the piston and thus constitute the first resistance stage for the hydraulic medium during the rebound stroke of the piston, while the valve 22 constitutes the second resistance stage during such rebound stroke.

Thus, with this construction, the flow of hydraulic medium from the lower portion of the pressure cylinder A upwardly through the piston 17 to the upper portion of the cylinder and the flow of hydraulic medium downwardly from the lower portion of the pressure cylinder A through the passages 61 in the base valve assembly is positively and definitely checked during the downward compression stroke of the piston in the pressure cylinder. Consequently, the full volume of the pressure cylinder A, instead of the usual piston rod displacement only, will be utilized for obtaining the desired shock absorber action.

What we claim as our invention is:

1. A hydraulic shock absorber having a pressure cylinder, a reserve chamber, a base compression valve controlling piston rod displacement of hydraulic medium from the pressure cylinder to the reserve chamber, and a piston assembly within the pressure cylinder having passages through which hydraulic medium may flow upwardly from the lower portion of the pressure cylinder to the upper portion thereof, and a valve for said passages positively controlling said upward flow of hydraulic medium so that the full volume of the pressure cylinder may be utilized to obtain a predetermined shock absorber action, the valve for said passages being so constructed that resistance offered thereby to said upward flow will be just a little less than or substantially the same as the resistance offered by the base compression valve aforesaid to piston rod displacement, the valve for said passages having one or more slots therein through which hydraulic medium may be metered from said piston assembly to the upper portion of the pressure cylinder above the piston assembly.

2. A hydraulic shock absorber having a pressure cylinder, a reserve chamber, a base compression valve controlling piston rod displacement of hydraulic medium from the pressure cylinder to the reserve chamber, a piston assembly within the pressure cylinder having passages through which hydraulic medium may flow upwardly from the lower portion of the pressure cylinder to the upper portion thereof, and a laminated valve for said passages positively controlling said upward flow of hydraulic medium so that the full volume of the pressure cylinder may be utilized to obtain a predetermined shock absorber action, the laminated valve for said passages being so constructed that resistance offered thereby to said upward flow will be just a little less than or substantially the same as the resistance offered by the base compression valve aforesaid to piston rod displacement, the lower lamination of the valve for said passages having one or more slots through which hydraulic medium may be metered from the piston assembly to the upper portion of the pressure cylinder above the piston assembly.

3. A hydraulic shock absorber having a pressure cylinder, and a piston assembly within said cylinder and comprising a piston having inner and outer sets of passages for hydraulic medium extending therethrough, and laminated disc valves mounted upon the top and bottom of said piston for controlling the flow of hydraulic medium through said passages, the lowermost lamination of the disc valve upon the top of the piston having means operable while said valve is in closed position to permit a restricted metered flow of hydraulic medium from one or more passages in the piston to the portion of the cylinder above said piston.

4. A hydraulic shock absorber having a pressure cylinder, and a piston assembly within said cylinder and comprising a piston having inner and outer sets of passages for hydraulic medium extending therethrough, and laminated disc valves mounted upon the top and bottom of said piston for controlling the flow of hydraulic medium through said passages, the laminated disc valve upon the top of the piston having one or more slots adapted while said valve is in closed position to permit a restricted metered flow of hydraulic medium from one or more passages in the piston to the portion of the cylinder above said piston.

5. A hydraulic shock absorber having a pressure cylinder, and a piston assembly within said cylinder, and comprising a piston having inner and outer sets of passages for hydraulic medium extending therethrough, and laminated disc valves mounted upon the top and bottom of said piston for controlling the flow of hydraulic medium through said passages, the laminated disc valve upon the top of the piston being substantially equal in area to the top of the piston and controlling the flow of hydraulic medium through the outer set of passages, the laminated disc valve upon the bottom of the piston having an area less than the area of the first mentioned valve and controlling the flow of hydraulic medium through the inner set of passages, the laminated disc valve upon the top of the piston having one or more slots adapted while said valve is in closed position to permit a restricted metered flow of hydraulic medium from one or more passages in the piston to the portion of the cylinder above said piston.

6. A hydraulic shock absorber having a pressure cylinder, a reserve chamber, a base compression valve assembly having means controlling movement of hydraulic medium between the pressure cylinder and reserve chamber, a piston assembly within the pressure cylinder having a set of passages through which hydraulic medium may flow from one portion of the pressure cylinder upon one side of the piston assembly to another portion of the cylinder upon the opposite side of the piston assembly, and a laminated valve for said passages positively controlling the flow of hydraulic medium so that the full volume of the pressure cylinder may be utilized to obtain a predetermined shock absorber action, the laminated valve for said passages being so constructed that resistance offered thereby to the flow of hydraulic medium will be just a little less than or substantially the same as the resistance offered by the controlling means of the base compression valve assembly, one ply of the laminated valve for said passages having one or more slots through which hydraulic medium may be metered while said valve is closed from the piston assembly to one of the portions aforesaid of the pressure cylinder.

7. A hydraulic shock absorber having a pressure cylinder, a piston assembly within the pressure cylinder having a set of passages through which hydraulic medium may flow from one portion of the pressure cylinder upon one side of the piston assembly to another portion of the cylinder upon the opposite side of the piston assembly, and a laminated valve for said passages controlling the flow of hydraulic medium through said passages, one ply of said laminated valve having one or more slots through which hydraulic medium may be metered from the piston assembly to one of the portions aforesaid of the pressure cylinder while said valve is in closed position.

8. A hydraulic shock absorber having a pressure cylinder, and a piston assembly within said cylinder and comprising a piston having inner and outer sets of passages for hydraulic medium extending therethrough, and valves mounted upon the top and bottom of said piston for controlling the flow of hydraulic medium through said passages, the valve upon the top of the piston having means operable while said valve is in closed position to permit a restricted metered flow of hydraulic medium from one or more passages in the piston to the portion of the cylinder above said piston.

9. A hydraulic shock absorber having a pressure cylinder, and a piston assembly within said cylinder and comprising a piston having inner and outer sets of passages for hydraulic medium extending therethrough, and valves mounted upon the top and bottom of said piston for controlling the flow of hydraulic medium through said passages, the valve upon the top of the piston having one or more slots through which hydraulic medium may be metered from the piston assembly to the upper portion of the pressure cylinder above the piston assembly while the valve is in closed position.

CHARLES E. READ.
JOHN M. NICKELSEN.
ARTHUR BOOR.